UNITED STATES PATENT OFFICE.

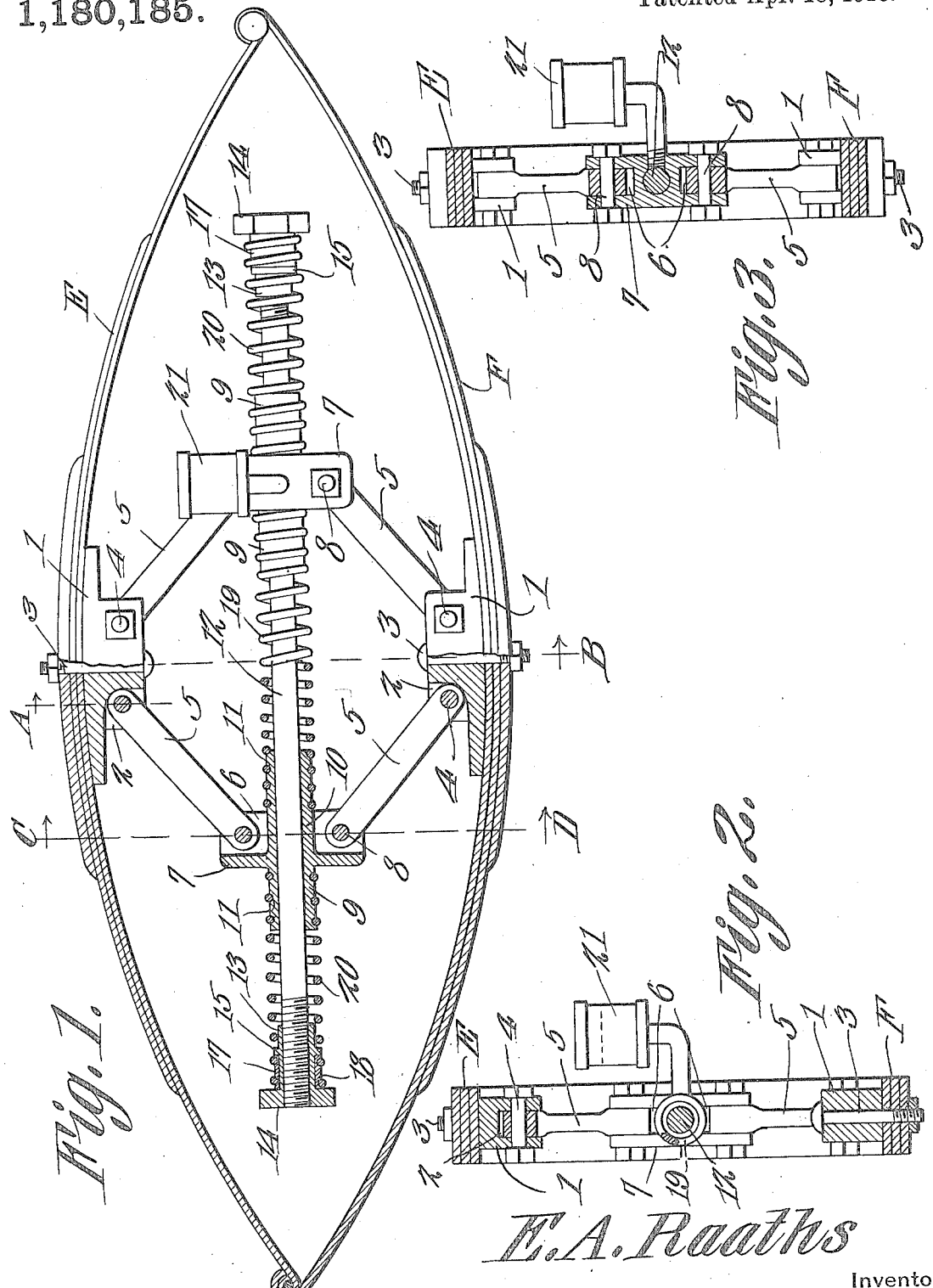

EMIL A. RAATHS, OF LAVEEN, ARIZONA.

SHOCK-ABSORBER.

1,180,185.   Specification of Letters Patent.   Patented Apr. 18, 1916.

Application filed July 10, 1915. Serial No. 39,149.

*To all whom it may concern:*

Be it known that I, EMIL A. RAATHS, a citizen of the United States, residing at Laveen, in the county of Maricopa and State of Arizona, have invented a new and useful Shock-Absorber, of which the following is a specification.

This invention relates to shock absorbers of the spring type adapted to be placed between relatively movable portions of a vehicle. For example, the structure can be interposed between the upper and lower portions of an elliptical spring or between a vehicle body and a bowed spring.

One of the objects of the invention is to provide a simple and compact structure of this character which can be readily applied to a vehicle and which will operate as an efficient means for retarding the rebound so that undesirable jolting will be eliminated.

Another object is to provide a shock absorber which is compact, cheap to manufacture, and which will not readily get out of order.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a view partly in side elevation and partly in section of a spring having the present improvements combined therewith. Fig. 2 is a section on line A—B Fig. 1. Fig. 3 is a section on line C—D Fig. 1.

Referring to the figures by characters of reference E and F designate the upper and lower portions respectively of an elliptical spring. The shock absorber comprising the present invention includes two opposed blocks 1 each of which has a pair of oppositely disposed recesses 2. The block 1 is adapted to be secured to one of the parts of the spring by means of a bolt 3 extending therethrough, or in any other manner desired. Pivot pins 4 are extended transversely through the recesses 2 and mounted on each pivot pin is a link 5. The upper and lower links are arranged in pairs and converge in the directions of the ends of the spring. The links of each pair extend into sockets 6 formed in a cross head 7, there being transverse pivot pins 8 within the sockets 6 and which are engaged by the links. Each cross head is provided with oppositely extending tubular projecting portions 9 and with a central opening 10. The projecting portions 9 are provided with spiral grooves 11. A rod 12 is slidably mounted within the two cross heads 7 and is provided, at each end, with a sleeve 13 screwed thereon. Each sleeve has an angular head 14 at its outer end and an annular flange 15 adjacent its inner end, there being a collar 17 mounted for rotation on the sleeve between head 14 and flange 15. This collar has a spiral groove 18 in its outer face. A cushioning spring 19 is arranged upon the middle portion of the rod 12 and has its end convolutions seated within the grooves 11 in the adjacent portions of the sleeves or projections 9. Additional cushioning springs 20 are interposed between the heads 14 and the cross heads 7 and have their end convolutions seated in the adjacent grooves 18 and 11. An oil cup 21 may be mounted on each cross head and so arranged as to direct a lubricant onto that portion of the rod 12 engaged by the cross head.

It will be apparent that the springs 19 and 20 work against each other with the result that the cross heads 7 are held constantly centered. When, however, the opposed portions of the elliptical spring are pressed toward each other, the links 5 act as toggles and thrust through heads 7 against springs 20 which act as cushions or retarding means. When the elliptical spring rebounds, these toggles tend to straighten out and thus compress the spring 19 between the cross heads. Consequently an efficient cushioning action will be set up.

It will be seen that the entire structure can be attached readily to a spring. Furthermore by fastening the springs as described, they will expand or contract according to the direction of movement of the parts, it being unnecessary to use any special fastening means. By mounting the outer ends of the springs 20 upon the loose collars 17, the sleeves 13 can be adjusted to increase or diminish the tension of the springs 20, without danger of unscrewing the collars 17 from the springs.

What is claimed is:

A shock absorber including blocks adapted to be secured to opposed relatively movable parts, a rod, cross heads slidably mounted on the rod, link connections between the cross heads and the blocks and constituting toggles, exteriorly threaded sleeves extending in opposite directions from the cross heads, a coiled spring interposed between the cross heads and threaded on the adjacent sleeves, sleeves adjustably engaging the ends of the rod, a collar revolubly mounted on each of said last named sleeves, and springs screwed upon the respective collars and the adjacent sleeves on the cross heads.

In testimony that I claim the foregoing as my own, I have hereto affixed my signature in the presence of two witnesses.

EMIL A. RAATHS.

Witnesses:
JOHN W. MAYES,
MOSE DRACHMAN.